United States Patent
Foege

(10) Patent No.: US 9,140,221 B2
(45) Date of Patent: Sep. 22, 2015

(54) FUEL RECOVERY SYSTEM

(71) Applicant: ELECTRO-MOTIVE DIESEL, INC., LaGrange, IL (US)

(72) Inventor: Aaron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 413 days.

(21) Appl. No.: 13/689,823

(22) Filed: Nov. 30, 2012

(65) Prior Publication Data

US 2014/0150753 A1 Jun. 5, 2014

(51) Int. Cl.
*F02M 33/02* (2006.01)
*F02M 21/02* (2006.01)
*F17C 9/02* (2006.01)

(52) U.S. Cl.
CPC ........... *F02M 33/02* (2013.01); *F02M 21/0218* (2013.01); *F17C 9/02* (2013.01)

(58) Field of Classification Search
CPC .............. F02M 33/02; F02M 21/0218; F02M 21/0224; F17C 7/02; F17C 7/04; F17C 9/02; F17C 9/04; F25B 9/04
USPC .............. 123/525, 527, 27 GE; 62/50.2, 50.3, 62/50.5, 53.2, 5, 48.1
See application file for complete search history.

(56) References Cited

U.S. PATENT DOCUMENTS

| | | | |
|---|---|---|---|
| 1,952,281 A * | 3/1934 | Ranque ................................ 62/5 |
| 2,242,299 A | 5/1941 | Harrington et al. |
| 2,550,886 A | 5/1951 | Thompson |
| 3,602,002 A | 8/1971 | Bailey et al. |
| 3,605,422 A * | 9/1971 | Pryor et al. ..................... 62/650 |
| 3,766,734 A | 10/1973 | Jones |
| 3,786,643 A * | 1/1974 | Anderson et al. ................... 62/5 |
| 3,919,852 A * | 11/1975 | Jones .................................. 62/7 |
| 4,017,283 A | 4/1977 | Witt |
| 4,559,786 A | 12/1985 | Schuck |
| 4,579,565 A * | 4/1986 | Heath .............................. 95/15 |
| 4,727,723 A | 3/1988 | Durr |
| 5,375,580 A * | 12/1994 | Stolz et al. ..................... 123/527 |
| 5,860,294 A * | 1/1999 | Brendeng ...................... 62/619 |
| 6,698,211 B2 | 3/2004 | Gustafson |
| 6,745,576 B1 * | 6/2004 | Granger ........................ 62/48.2 |
| 7,308,889 B2 | 12/2007 | Post et al. |

(Continued)

FOREIGN PATENT DOCUMENTS

JP 2009216078 9/2009

*Primary Examiner* — Lindsay Low
*Assistant Examiner* — Grant Moubry
(74) *Attorney, Agent, or Firm* — Finnegan, Henderson, Farabow, Garrett & Dunner, LLP

(57) ABSTRACT

A fuel recovery system for a machine is disclosed. The fuel recovery system may have a tank configured to store a liquid fuel. The fuel recovery system may also have an accumulator fluidly connected to the tank and configured to receive gaseous fuel formed in the tank. The fuel recovery system may further have a compressor fluidly connected to the accumulator and configured to compress the gaseous fuel. In addition, the fuel recovery system may have a separator fluidly connected to the compressor and the tank. The separator may be configured to receive the compressed gaseous fuel, and separate the compressed gaseous fuel into a first flow of gaseous fuel at a first temperature and a second flow of gaseous fuel at a second temperature. In addition, the separator may be configured to direct the second flow to the tank.

18 Claims, 3 Drawing Sheets

(56) References Cited

U.S. PATENT DOCUMENTS

| | | | |
|---|---|---|---|
| 7,690,365 B2 * | 4/2010 | Lee et al. | 123/527 |
| 8,117,852 B2 * | 2/2012 | Mak | 62/48.1 |
| 8,210,214 B2 * | 7/2012 | Casey et al. | 141/4 |
| 8,505,312 B2 * | 8/2013 | Mak et al. | 62/50.2 |
| 8,959,930 B2 * | 2/2015 | Lee et al. | 62/49.2 |
| 2006/0053806 A1 | 3/2006 | Tassel | |
| 2010/0186446 A1 * | 7/2010 | Turner et al. | 62/611 |

\* cited by examiner

FUEL RECOVERY SYSTEM

TECHNICAL FIELD

The present disclosure relates generally to a fuel recovery system and, more particularly, to a gaseous fuel recovery system.

BACKGROUND

Natural gas has received much attention as a plentiful and viable alternative to traditional fuels such as diesel. Natural gas, however, has a lower energy density than traditional fuels such as diesel and gasoline. As a result, mobile machines generally use liquefied natural gas ("LNG") as fuel. To maintain natural gas in liquid form at atmospheric pressure, its temperature must remain below about −160° C. Mobile machines utilizing LNG as a fuel, therefore, typically store LNG in insulated tanks. Some heat can still enter the tank because of imperfect insulation, causing some of the LNG to change its state to a gaseous form.

The gaseous fuel ("boil-off") accumulates near the upper portions of the tank. Moreover, as the amount of gaseous fuel produced in the tank increases, the pressure within the tank also increases. The increasing pressure, if left unchecked, can damage the tank and can even cause the tank to explode. Traditional LNG systems, therefore, vent the gaseous fuel (composed mostly of methane) directly to the atmosphere. Government regulations, however, no longer permit direct venting of gaseous fuel to the atmosphere because it contributes to greenhouse gas (GHG) emissions. To get around this problem, some LNG systems ignite the gaseous fuel as it vents to atmosphere, thus reducing the amount of methane leaving the tank. Although effective, this process results in an inefficient waste of potential fuel energy.

One attempt to address the problems described above is disclosed in Japanese Patent No. JP 2009216078 of Masataka et al. that issued on Sep. 24, 2009 ("the '078 patent"). In particular, the '078 patent discloses a canister containing an adsorbent material to adsorb fuel vapors generated in a fuel tank. The '078 patent further discloses a vortex tube, which receives a supply of compressed air at an inlet and separates the compressed air into a hot stream of air and a cold stream of air. The system of the '078 patent directs the cold air stream towards the fuel tank, cooling the fuel tank, and reducing the amount of fuel vapor produced in the tank. Simultaneously, the system of the '078 patent directs the hot air stream towards the canister to help segregate the adsorbed fuel from the adsorbent material and introduces the segregated fuel into the suction passage of an engine. The '078 patent also discloses that at least a portion of the gaseous fuel formed in the fuel tank is discharged to the atmosphere.

Although the '078 patent discloses a method for partial recovery of fuel vapor generated in a fuel tank, the system of the '078 patent requires an adsorbent material to adsorb and release the fuel vapor generated in the fuel tank. Moreover, the '078 patent requires an external source of compressed air to generate the required hot and cold streams of air. The adsorbent material and external source of compressed air add complexity and make the system of the '078 patent more expensive. Further, although the system of the '078 patent consumes some of the fuel vapor by using it in the engine, the system of the '078 patent also discharges some fuel vapor into the atmosphere contributing to GHG emissions.

The fuel recovery system of the present disclosure solves one or more of the problems set forth above and/or other problems in the art.

SUMMARY

In one aspect, the present disclosure is directed to a fuel recovery system for a machine. The fuel recovery system may include a tank configured to store a liquid fuel. The fuel recovery system may also include an accumulator fluidly connected to the tank. The accumulator may be configured to receive gaseous fuel formed in the tank. The fuel recovery system may further include a compressor fluidly connected to the accumulator. The compressor may be configured to compress the gaseous fuel. In addition, the fuel recovery system may include a separator fluidly connected to the compressor and the tank. The separator may be configured to receive the compressed gaseous fuel. The separator may also be configured to separate the compressed gaseous fuel into a first flow of gaseous fuel at a first temperature and a second flow of gaseous fuel at a second temperature. In addition, the separator may be configured to direct the second flow to the tank.

In another aspect, the present disclosure is directed to a method of recovering gaseous fuel from a tank containing liquid fuel. The method may include collecting the gaseous fuel from the tank in an accumulator. The method may also include compressing the gaseous fuel. The method may further include separating the compressed gaseous fuel into a first flow of gaseous fuel at a first temperature and a second flow of gaseous fuel at a second temperature. In addition, the method may include returning the second flow to the tank.

DETAILED DESCRIPTION

Figure 1:
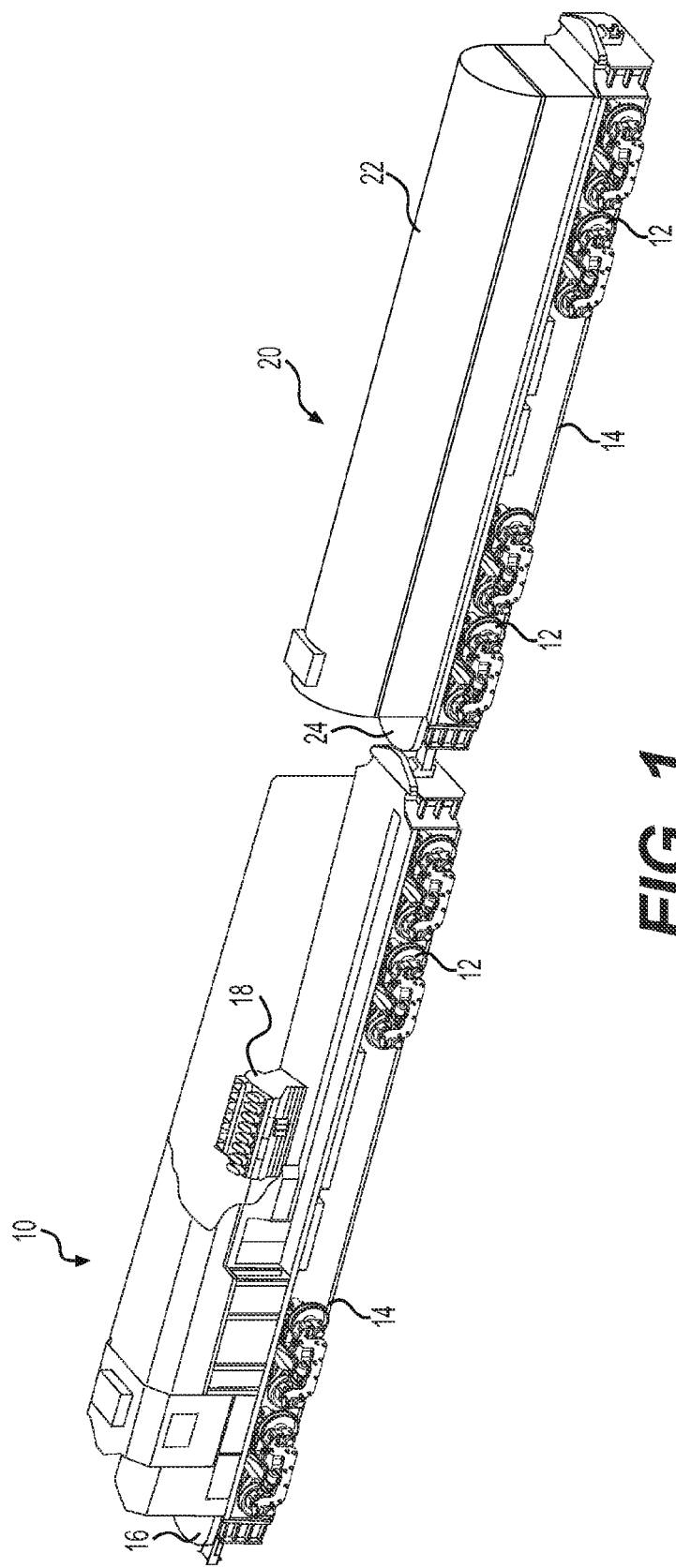
FIG. 1 is a pictorial illustration of an exemplary disclosed machine.

FIG. 1 illustrates an exemplary embodiment of a machine 10. Machine 10 may be a mobile machine that performs some type of operation associated with an industry such as railroad, marine, mining, construction, farming, power generation, or another industry known in the art. For example, machine 10 may be a locomotive designed to pull rolling stock. Machine 10 may have a plurality of wheels 12 configured to engage a track 14 and a first base platform 16 supported by wheels 12. Machine 10 may also have an engine 18 mounted to first base platform 16 and configured to drive wheels 12. Any number of additional engines may be included within machine 10 and operated to produce power that may be transferred to one or more traction motors (not shown) used to drive wheels 12. In an exemplary embodiment as shown in FIG. 1, engine 18 may be lengthwise aligned on first base platform 16 along a travel direction of machine 10. One skilled in the art will recognize, however, that engine 18 may be located in tandem, transversally, or in any other orientation on first base platform 16.

Machine 10 may also include a tender 20. Tender 20 may include a tank 22 configured to store a liquid fuel for combustion within engine 18. Tank 22 may be an insulated, single or multi-walled tank configured to store a liquid fuel at low temperatures. In one exemplary embodiment, tank 22 may be configured to store a liquid fuel at a temperature below about −160° C. In another exemplary embodiment, the liquid fuel stored in tank 22 may be liquid natural gas. Tank 22 may be mounted to a second base platform 24 of tender 20 configured to be moved by machine 10. Tank 22 may also be connected to engine 18 to supply fuel to engine 18. Second base platform 24 may be supported by wheels 12. Although machine 10 has been illustrated as having tank 22 mounted on tender 20, alternatively, tank 22 may be mounted to first base platform 16, if desired. Similarly, engine 18 may be mounted to second base platform 24 instead of being mounted to first base platform 16, if desired.

Figure 2:
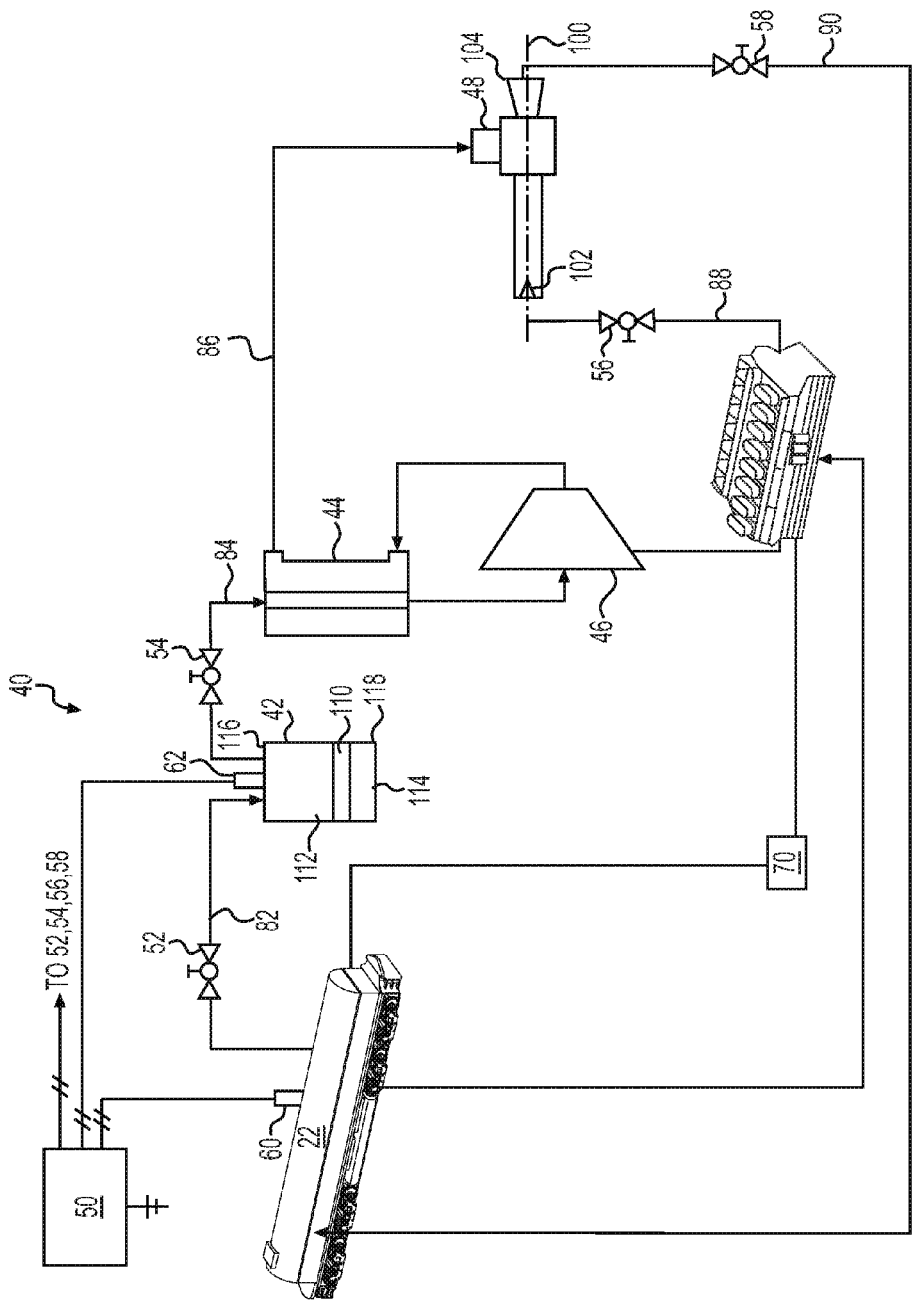
FIG. 2 is a schematic of an exemplary disclosed fuel recovery system that may be used in conjunction with the machine of FIG. 1.

FIG. 2 illustrates a schematic diagram of a fuel recovery system 40 that may be used in conjunction with machine 10 shown in FIG. 1. Fuel recovery system 40 may include components that cooperate to maintain a first pressure in tank 22 below a safety threshold. In one exemplary embodiment, the safety threshold may be selected as a fraction of the pressure at which tank 22 may structurally fail or explode. In another exemplary embodiment, the safety threshold may be about 6 to 7 atmospheres.

Fuel recovery system 40 may include tank 22, accumulator 42, heat exchanger 44, compressor 46, separator 48, engine 18, and controller 50. Fuel recovery system 40 may also include first control valve 52, second control valve 54, third control valve 56, and fourth control valve 58. In addition, fuel recovery system 40 may include first pressure sensor 60 and second pressure sensor 62. Fuel recovery system 40 may also include a refrigeration system 70 and temperature sensors (not shown) to monitor the temperature in various portions of the system.

As shown in FIG. 2, accumulator 42 may be fluidly connected to tank 22. Gaseous fuel may be directed from tank 22 to accumulator 42 through passageway 82. First pressure sensor 60 may be mounted on tank 22 to measure a first pressure within tank 22. First control valve 52 may be mounted on passageway 82 to selectively direct gaseous fuel from tank 22 to accumulator 42 when the first pressure measured by first pressure sensor 60 exceeds a first pressure threshold. In one exemplary embodiment, the first pressure threshold may be about 1.5 atmospheres.

Compressor 46 may be fluidly connected to accumulator 42. Gaseous fuel from accumulator 42 may be directed to compressor 46 through passageway 84. Second pressure sensor 62 may be mounted on accumulator 42 to measure a second pressure within accumulator 42. Second control valve 54 may be mounted on passageway 84 to selectively direct gaseous fuel to compressor 46 when the second pressure in accumulator 42 exceeds a second pressure threshold. In one exemplary embodiment, the second pressure threshold may be about 1.5 atmospheres. Compressor 46 may compress the gaseous fuel and direct the compressed gaseous fuel through passageway 86 to separator 48, which may be fluidly connected to compressor 46.

A heat exchanger 44 may be disposed on passageways 84, 86, between accumulator 42 and separator 48, such that gaseous fuel flowing from accumulator 42 to compressor 46 in passageway 84 may exchange heat with the compressed gaseous fuel passing from compressor 46 to separator 48 through passageway 86. Specifically, heat from the compressed gaseous fuel in passageway 86 may flow to the gaseous fuel in passageway 84, thereby cooling the compressed gaseous fuel after it leaves compressor 46.

Separator 48 may separate the compressed gaseous fuel received from compressor 46 into a first flow of gaseous fuel and a second flow of gaseous fuel. The first flow of gaseous fuel from separator 48 may be directed via passageway 88 to engine 18. Third control valve 56 may be mounted on passageway 88 to control an amount of the first flow transferred to engine 18. The first flow may be combusted in engine 18 to generate power which may be used to drive compressor 46. It is contemplated, however, that power generated by engine 18 may be used for functions of machine 10 other than driving compressor 46. For example, the power generated by engine 18 may be used to drive refrigeration system 70, which may be used to cool the liquid fuel in tank 22. The second flow of gaseous fuel from separator 48 may be directed to flow through passageway 90 back to tank 22. Fourth control valve 58 may be mounted on passageway 90 to control an amount of the second flow transferred to tank 22 from separator 48.

The first flow of gaseous fuel may have a first temperature as it exits separator 48. Similarly, the second flow of gaseous fuel may have a second temperature as it exits separator 48. In one exemplary embodiment, the second temperature may be lower than the first temperature. In another exemplary embodiment, the second temperature may be lower than a condensation temperature of the liquid fuel at atmospheric pressure. In yet another exemplary embodiment, the liquid fuel in tank 22 may be LNG and the second temperature may be about −160° C. The second flow of gaseous fuel may be bubbled through the liquid fuel stored in tank 22 and may condense in tank 22. Thus, by combusting the first flow of gaseous fuel in engine 18 and condensing the second flow of gaseous fuel in tank 22, the first pressure in tank 22 may be maintained below the safety threshold without discharging any gaseous fuel into the atmosphere.

Accumulator 42 may be a floating piston type accumulator. For example, as illustrated in FIG. 2, accumulator 42 may include a piston 110, which separates a first chamber 112 of accumulator 42 from a second chamber 114. Gaseous fuel from tank 22 may enter first chamber 112 of accumulator 42. As gaseous fuel flows into first chamber 112, piston 110 may move from first end 116 of accumulator 42 towards second end 118, compressing gas trapped in second chamber 114. It is contemplated that the gas in second chamber 114 may include air or alternatively may include gaseous fuel from tank 22. As gaseous fuel continues to flow into first chamber 112, compressed gas in second chamber 114 may resist movement of piston 110 towards second end 118. As a result pressure in first chamber 112 may increase. Moreover, when gaseous fuel is permitted to exit accumulator 42 through second control valve 54, the compressed gas in second chamber 114 may push piston 110 from second end 118 towards first end 116 thereby expelling the gaseous fuel from first chamber 112. Although accumulator 42 has been described above as a piston type accumulator, it is contemplated that accumulator 42 may take other forms. For example, accumulator 42 may be a bladder type accumulator made of a material that can expand as gaseous fuel fills accumulator 42. Alternatively, accumulator 42 may be a pressure vessel.

Heat exchanger 44 may be a gas-to-gas heat exchanger. For example, heat exchanger 44 may embody a flat-plate heat exchanger or a shell-and-tube heat exchanger. As the compressed gaseous fuel passes through heat exchanger 44, the compressed gaseous fuel may conduct heat through internal walls of heat exchanger 44 to gaseous fuel also passing through heat exchanger 44. It is contemplated that the gaseous flows in heat exchanger 44 may be parallel flows, opposite flows, or cross flows, as desired. Although only one heat exchanger 44 is shown in FIG. 2, one skilled in the art would recognize that more than one heat exchanger 44 may be included in fuel recovery system 40.

Compressor 46 may be a single-stage or multi-stage compressor and may be mechanically or electrically driven by engine 18 or by any other power source known in the art. Compressor 46 may be configured to pressurize gaseous fuel, for example, natural gas, propane, or methane, that is directed to compressor 46 from accumulator 42 through passageway 84. It is contemplated that fuel recovery system 40 may include more than one compressor 46, which may be used to compress the gaseous fuel from the accumulator.

Separator 48 may be a Hilsch vortex generator. For example, the compressed gaseous flow from passageway 86 may be injected into a swirl chamber (not shown) of separator 48 and accelerated to a high rate of rotation about an axis 100. Separator 48 may include a nozzle 102, at one end which may allow only an outer shell of the compressed gaseous fuel to escape as the first flow from nozzle 102. The remainder of the compressed gaseous fuel may be forced to exit from outlet 104 in a vortex of reduced diameter. Although a Hilsch vortex generator is described above, one skilled in the art would recognize that separator 48 may take other forms. For example, separator 48 may be a membrane based separator, an adsorption type separator, an absorption type separator, a distillation type separator or any other type of gas-gas separator known in the art.

First control valve 52 may be a two position or proportional type valve having a valve element movable to regulate a flow of gaseous fuel through passageway 82. The valve element in first control valve 52 may be solenoid-operable to move between a flow-passing position and a flow-blocking position. In the flow-passing position, first control valve 52 may permit fluid to flow through passageway 82 substantially unrestricted by first control valve 52. In contrast, in the flow-blocking position, first control valve 52 may completely block fluid from flowing through passageway 82. Second, third, and fourth control valves 54, 56, 58 may have structures and methods of operation similar to those of first control valve 54.

Refrigeration system 70 may include a compressor driven by engine 18, a condenser, and an evaporator that are coupled to each other via a closed-circuit. The compressor may be configured to compress a refrigerant, for example R-134, propane, nitrogen, helium, or any other appropriate refrigerant known in the art. As the refrigerant is pressurized, it is vaporized and moves into the condenser as a high-pressure gas. Within the condenser, the refrigerant cools and condenses back into liquid form at a lower energy state than when initially within the compressor. The lower-energy liquid then passes into the evaporator, where it is expanded, causing a rapid drop in temperature. Liquid fuel from tank 22 may be circulated around the evaporator of refrigeration system 70 to transfer heat to the evaporator thereby chilling the liquid fuel and warming the refrigerant in preparation for another cycle. Alternatively the evaporator of refrigeration system 70 may be immersed in the liquid fuel in tank 22, if desired.

Controller 50 may be configured to control the operation of fuel recovery system 40. Controller 50 may embody a single or multiple microprocessors, digital signal processors (DSPs), etc. that include means for controlling an operation of fuel recovery system 40 and engine 18. Numerous commercially available microprocessors can be configured to perform the functions of controller 50. It should be appreciated that controller 50 could readily embody a microprocessor separate from that controlling other machine-related functions, or that controller 50 could be integral with a machine microprocessor and be capable of controlling numerous machine functions and modes of operation. If separate from the general machine microprocessor, controller 50 may communicate with the general machine microprocessor via datalinks or other methods. Various other known circuits may be associated with controller 50, including power supply circuitry, signal-conditioning circuitry, actuator driver circuitry (i.e., circuitry powering solenoids, motors, or piezo actuators), and communication circuitry.

Controller 50 may also be configured to regulate operation of first, second, third, and fourth control valves 52, 54, 56, 58. For example, controller 50 may cause first control valve 52 to direct some or all gaseous fuel from tank 22 to accumulator 42 based on the signals received from first pressure sensor 60 in tank 22. Similarly, controller 50 may cause second control valve 54 to direct some or all gaseous fuel from accumulator 42 to compressor 46 based on the signals received from the second pressure sensor 62 in accumulator 42. Controller may adjust flows of gaseous fuel through third and fourth control valves 56, 58 to ensure that the first and second pressures in tank 22 and accumulator 42, respectively, remain below the first and second pressure thresholds.

Figure 3:
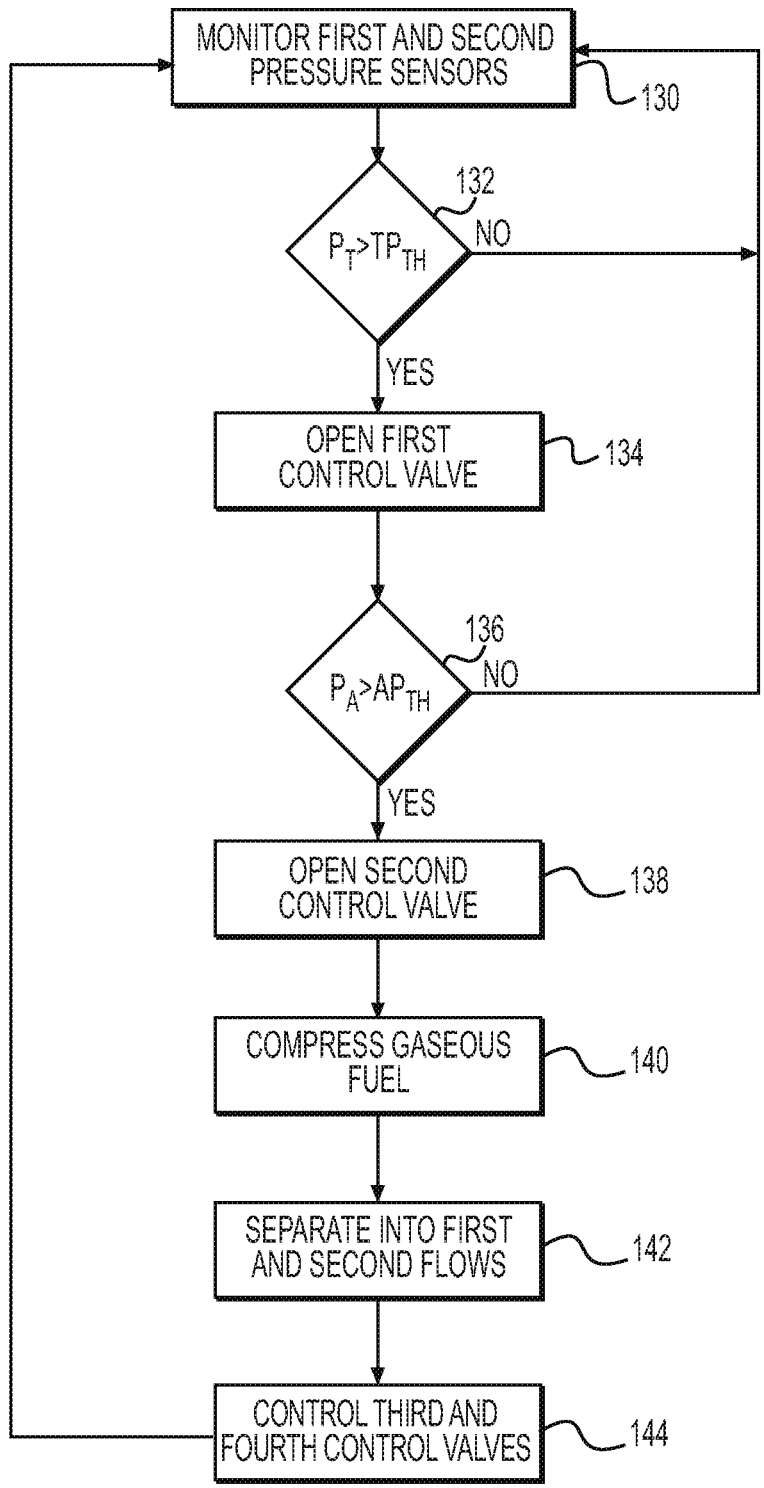
FIG. 3 is a flow chart illustrating an exemplary disclosed method performed by the fuel recovery system of FIG. 2.

FIG. 3 illustrates an exemplary operation performed by controller 50 during fuel recovery operations. FIG. 3 will be discussed in more detail in the following section to further illustrate the disclosed concepts.

INDUSTRIAL APPLICABILITY

The disclosed fuel recovery system may be used in any machine or power system application where it is beneficial to recover vaporized liquid fuel from a liquid fuel tank. The disclosed fuel recovery system may find particular applicability with mobile machines such as locomotives that can be exposed to extreme environmental conditions, including extremely hot ambient temperatures. The disclosed fuel recovery system may provide an improved method for recovering gaseous fuel by drawing some or all of the gaseous fuel from the fuel tank, using a portion of the gaseous fuel to generate power in an engine, and condensing and returning the remaining portion of the gaseous fuel to the fuel tank. Operation of fuel recovery system 40 will now be described.

During operation of machine 10, liquid fuel in tank 22 may vaporize and accumulate in an upper portion of tank 22. As gaseous fuel accumulates in tank 22, pressure within tank 22 may rise and exceed a first pressure threshold. Controller 50 may continuously monitor the first and second pressure sensors in tank 22 and accumulator 42, respectively (Step 130). Controller 50 may ascertain based on these signals whether the first pressure "$P_T$" in tank 22 has exceeded the first pressure threshold "$TP_{TH}$" (Step 132). When controller 50 determines that the first pressure "$P_T$" has not exceeded the first pressure threshold "$TP_{TH}$" (Step 132, NO), controller 50 may return to step 130 and continue to monitor the first and second pressure sensors in tank 22 and accumulator 42, respectively. When controller 50 determines, however, that the first pressure "$P_T$" in tank 22 has exceeded the first pressure threshold "$TP_{TH}$" (Step 132, YES), controller 50 may open first control valve 52 to direct gaseous fuel from tank 22 to flow to accumulator 42 (Step 134).

Controller 50 may ascertain whether pressure "$P_A$" in accumulator 42 has exceeded the second pressure threshold "$AP_{TH}$" (Step 136). When controller 50 determines that the second pressure "$P_A$" has not exceeded the second pressure threshold "$AP_{TH}$" (Step 136, NO), controller 50 may return to step 130 and continue to monitor the first and second pressure sensors in tank 22 and accumulator 42, respectively. When controller 50 determines, however, that the second pressure "$P_A$" in accumulator 42 has exceeded the second pressure threshold "$AP_{TH}$" (Step 136, YES), controller 50 may open second control valve 54 to direct gaseous fuel from accumulator 42 to flow to compressor 46 (Step 138).

Compressor 46 may compress the gaseous fuel received from accumulator 42 and direct the compressed gaseous fuel to separator 48 (Step 140). Separator 48 may separate the compressed gaseous fuel into a first flow of gaseous fuel and a second flow of gaseous fuel (Step 142). Controller 50 may control third control valve 56 to direct the first flow of gaseous fuel to engine 18 and fourth control valve 58 to direct the second flow of gaseous fuel to tank 22 (Step 144). At this point controller may return to step 130 to continue monitoring the first and second pressure sensors 60, 62. The disclosed fuel recovery system may help eliminate GHG emissions by maintaining the pressure within fuel tank below the safety threshold without discharging gaseous fuel into the atmosphere. The disclosed fuel recovery system may also provide a less complex and more economical system by using an accumulator to collect and recover the gaseous fuel.

It will be apparent to those skilled in the art that various modifications and variations can be made to the disclosed fuel recovery system without departing from the scope of the disclosure. Other embodiments of the fuel recovery system will be apparent to those skilled in the art from consideration of the specification and practice of the fuel recovery system disclosed herein. It is intended that the specification and examples be considered as exemplary only, with a true scope of the disclosure being indicated by the following claims and their equivalents.

What is claimed is:

1. A fuel recovery system comprising:
   a tank configured to store a liquid fuel;
   an accumulator fluidly connected to the tank and configured to receive gaseous fuel formed in the tank;
   a compressor fluidly connected to the accumulator and configured to compress the gaseous fuel;
   a first control valve configured to selectively direct the gaseous fuel from the tank to the accumulator when a first pressure in the tank exceeds a first pressure threshold;
   a second control valve configured to selectively direct the gaseous fuel from the accumulator to the compressor when a second pressure in the accumulator exceeds a second pressure threshold; and
   a separator fluidly connected to the compressor and the tank and configured to:
     receive the compressed gaseous fuel from the compressor,
     separate the compressed gaseous fuel into a first flow of gaseous fuel at a first temperature and a second flow of gaseous fuel at a second temperature, and
     direct the second flow to the tank.

2. The fuel recovery system of claim 1, further including a heat exchanger fluidly connected to the accumulator and the compressor and configured to cool the compressed gaseous fuel exiting the compressor using the gaseous fuel received from the accumulator.

3. The fuel recovery system of claim 2, wherein the second temperature is lower than the first temperature.

4. The fuel recovery system of claim 3, wherein the separator is a Hilsch vortex generator.

5. The fuel recovery system of claim 4, further including an engine configured to receive the first flow.

6. The fuel recovery system of claim 1, further including:
   a controller in communication with the first control valve and the second control valve, the controller being configured to selectively direct flows of the gaseous fuel from the tank and the accumulator.

7. The fuel recovery system of claim 6, wherein the accumulator is a floating piston accumulator.

8. The fuel recovery system of claim 6, wherein the engine drives the compressor.

9. The fuel recovery system of claim 6, wherein the engine drives a refrigeration system configured to cool the liquid fuel in the tank.

10. A method of recovering gaseous fuel from a tank containing liquid fuel, comprising:
    controlling a first control valve to selectively direct gaseous fuel from the tank to the accumulator when a first pressure in the tank exceeds a first threshold;
    collecting the gaseous fuel from the tank in an accumulator;
    controlling a second control valve to selectively direct the gaseous fuel from the accumulator to a compressor when a second pressure in the accumulator exceeds a second threshold;
    compressing the gaseous fuel;
    separating the compressed gaseous fuel into a first flow of gaseous fuel at a first temperature and a second flow of gaseous fuel at a second temperature; and
    returning the second flow to the tank.

11. The method of claim 10, further including:
    circulating the gaseous fuel from the tank through a heat exchanger;
    circulating the compressed gaseous fuel through the heat exchanger; and
    cooling the compressed gaseous fuel using the gaseous fuel from the tank.

12. The method of claim 10, wherein separating further includes:
    injecting the compressed gaseous fuel into a Hilsch vortex generator;
    removing the first flow from an outer periphery of the generator; and
    removing the second flow from a center of the generator.

13. The method of claim 12, wherein the second temperature is lower than a condensation temperature of the fuel at atmospheric pressure.

14. The method of claim 13, further including:
    supplying the first flow to an engine; and
    combusting the first flow in the engine to generate power.

15. The method of claim 14, further including using the power generated by the engine to drive the compressor.

16. The method of claim 15, further including:
    using the power generated by the engine to drive a refrigeration system; and
    using the refrigeration system to cool the fuel in the tank.

17. A machine comprising:
    a platform;
    a plurality of wheels configured to support the platform;
    a tank mounted on the platform and configured to store a liquid fuel;
    an accumulator fluidly connected to the tank and configured to receive gaseous fuel from the tank;
    a compressor fluidly connected to the accumulator and configured to compress the gaseous fuel;
    a first control valve configured to selectively direct the gaseous fuel from the tank to the accumulator when a first pressure in the tank exceeds a first pressure threshold;
    a second control valve configured to selectively direct the gaseous fuel from the accumulator to the compressor when a second pressure in the accumulator exceeds a second pressure threshold;
    a heat exchanger fluidly connected to the compressor and configured to cool compressed gaseous fuel exiting the compressor;

an engine configured to drive the compressor; and
a Hilsch vortex generator fluidly connected to the compressor and the tank and configured to:
  receive the compressed gaseous fuel from the compressor,
  separate the compressed gaseous fuel into a first flow of gaseous fuel at a first temperature and a second flow of gaseous fuel at a second temperature lower than the first temperature,
  direct the first flow to the engine, and
  direct the second flow to the tank.

18. The machine of claim 17, further including:
a controller in communication with the first control valve and the second control valve and configured to selectively direct flows of gaseous fuel from the tank and the accumulator.

* * * * *